(12) United States Patent
Gandra

(10) Patent No.: US 11,020,817 B2
(45) Date of Patent: Jun. 1, 2021

(54) METHOD AND APPARATUS FOR CREATING CHANNELS IN WORKPIECES

(71) Applicant: The Welding Institute, Cambridgeshire (GB)

(72) Inventor: Joao Gandra, Cambridgeshire (GB)

(73) Assignee: The Welding Institute, Cambridgeshire (GB)

( * ) Notice: Subject to any disclaimer, the term of this patent is extended or adjusted under 35 U.S.C. 154(b) by 128 days.

(21) Appl. No.: 16/346,285

(22) PCT Filed: Oct. 11, 2017

(86) PCT No.: PCT/GB2017/053069
§ 371 (c)(1),
(2) Date: Apr. 30, 2019

(87) PCT Pub. No.: WO2018/083438
PCT Pub. Date: May 11, 2018

(65) Prior Publication Data
US 2019/0255647 A1    Aug. 22, 2019

(30) Foreign Application Priority Data
Nov. 1, 2016  (GB) ..................................... 1618422

(51) Int. Cl.
*B23K 20/12*      (2006.01)
*B23K 101/14*     (2006.01)

(52) U.S. Cl.
CPC ...... *B23K 20/1255* (2013.01); *B23K 2101/14* (2018.08)

(58) Field of Classification Search
CPC .................. B23K 2101/14; B23K 20/122–128
(Continued)

(56) References Cited

U.S. PATENT DOCUMENTS

| 5,630,683 A | 5/1997 | Smith | |
| 6,045,028 A * | 4/2000 | Martin | B23K 20/122 228/112.1 |

(Continued)

FOREIGN PATENT DOCUMENTS

| CN | 204975681 U | 1/2016 |
| DE | 102014115535 B3 * | 3/2016 |

(Continued)

OTHER PUBLICATIONS

International Searching Authority., International Search Report and Written Opinion dated Feb. 13, 2018 for PCT Application No. PCT/GB2017/053069 Filed Oct. 11, 2017, 10 pages.

(Continued)

*Primary Examiner* — Kiley S Stoner
(74) *Attorney, Agent, or Firm* — Brooks Cameron & Huebsch, PLLC

(57) ABSTRACT

A friction stir channelling tool comprises a probe (2) for inserting into a workpiece or workpieces. The probe (2) extends from, and is rotatably mounted in, a bore (14) of a shoulder (3), the probe surface being formed so as to cause plasticised workpiece material to be moved towards the shoulder and into the bore of the shoulder upon rotation of the probe while the shoulder is in contact with the workpiece. The shoulder (3) has at least one vent (4) extending from outside the shoulder to the bore (14) whereby the plasticised material can exit the bore through the vent.

20 Claims, 4 Drawing Sheets

(58) Field of Classification Search
USPC .............................. 228/112.1–114.5, 2.1–2.3
See application file for complete search history.

(56) References Cited

U.S. PATENT DOCUMENTS

| | | | | |
|---|---|---|---|---|
| 6,053,391 A * | 4/2000 | Heideman | ............ | B23K 20/122 228/2.1 |
| 6,227,430 B1 * | 5/2001 | Rosen | ................ | B23K 20/1255 156/73.5 |
| 6,325,273 B1 * | 12/2001 | Boon | ................. | B23K 20/1245 228/112.1 |
| 6,923,362 B2 | 8/2005 | Mishra | | |
| 7,416,102 B1 * | 8/2008 | Trapp | ................. | B23K 20/1225 228/112.1 |
| 8,857,696 B1 * | 10/2014 | Merah | ................ | B23K 20/1265 228/2.1 |
| 8,998,064 B2 * | 4/2015 | Russell | ................ | B23K 20/124 228/112.1 |
| 9,573,222 B2 * | 2/2017 | Tavares | ................ | B23K 20/126 |
| 2002/0153130 A1 * | 10/2002 | Okamoto | ................ | B23P 15/26 165/170 |
| 2004/0050907 A1 * | 3/2004 | Dracup | .............. | B23K 20/1265 228/112.1 |
| 2004/0060965 A1 * | 4/2004 | Mishra | ................ | B23K 20/123 228/112.1 |
| 2006/0163316 A1 * | 7/2006 | Burton | ................. | B23K 20/125 228/2.1 |
| 2007/0152015 A1 * | 7/2007 | Burton | ................. | B23K 20/126 228/2.1 |
| 2008/0006677 A1 * | 1/2008 | Kumagai | ........... | B23K 20/1265 228/101 |
| 2008/0245516 A1 * | 10/2008 | Ishikawa | .................. | F28F 3/12 165/164 |
| 2008/0251571 A1 * | 10/2008 | Burford | ............. | B23K 20/1255 228/114.5 |
| 2009/0123778 A1 * | 5/2009 | Russell | ............. | B23K 20/1275 428/661 |
| 2010/0089976 A1 * | 4/2010 | Szymanski | .......... | B23K 20/122 228/113 |
| 2010/0101768 A1 * | 4/2010 | Seo | .................... | B23K 20/1225 165/168 |
| 2010/0314075 A1 * | 12/2010 | Takahashi | ........... | C23C 14/3407 165/104.19 |
| 2011/0180587 A1 * | 7/2011 | Trapp | ................. | B23K 20/1265 228/2.1 |
| 2011/0277959 A1 * | 11/2011 | Morin | ..................... | B23P 15/26 165/104.11 |
| 2012/0181324 A1 * | 7/2012 | Yamauchi | ............ | B23K 20/124 228/114 |
| 2016/0175981 A1 * | 6/2016 | Kandasamy | ....... | B23K 20/1245 228/114.5 |
| 2017/0304933 A1 * | 10/2017 | Miles | ..................... | B23K 9/042 |
| 2018/0056439 A1 * | 3/2018 | Thomas | ............... | B23K 20/124 |
| 2018/0200829 A1 * | 7/2018 | Campbell | ............ | B23K 20/122 |
| 2018/0361501 A1 * | 12/2018 | Hardwick | ............ | B23K 20/227 |
| 2019/0210147 A1 * | 7/2019 | Karvinen | ............ | B23K 20/1215 |
| 2019/0255647 A1 * | 8/2019 | Gandra | ............. | B23K 20/1255 |

FOREIGN PATENT DOCUMENTS

| | | |
|---|---|---|
| EP | 615480 | 11/1995 |
| PT | 105628 | 10/2012 |
| SU | 1252073 | 8/1986 |
| WO | 1995/26254 | 10/1995 |

OTHER PUBLICATIONS

Database WPI, Week 198715, Thomson Scientific, London, GB, AN 1987-107083, XP002777768 as cited in the International Search Report and Written Opinion dated Feb. 13, 2018, 1 page.

Database WPI, Thomson Scientific, London, GB, AN 2012-P21969, XP002777769 as cited in the International Search Report and Written Opinion dated Feb. 13, 2018, 1 page.

\* cited by examiner

METHOD AND APPARATUS FOR CREATING CHANNELS IN WORKPIECES

FIELD OF THE INVENTION

The present invention relates to a method for forming channels in workpieces.

BACKGROUND TO THE INVENTION

A development of friction stir welding is known as friction stir channelling, where the friction stir process is modified so as to intentionally cause material to be moved from the bulk of the workpiece, forming a channel. This method can be used to create passages for fluids (e.g. for heat exchange) or other matter. The first known description of this process appeared in the application for U.S. Pat. No. 6,923,362B.

U.S. Pat. No. 6,923,362B describes the production of integral channels in metal bodies where internal fluid flow is desired, such as a heat exchanger. It further describes a tool with a variable-handed thread, that moves material from the middle of the pin length toward the regions at its distal tip and proximate the shoulder, forming a channel in the workpiece(s) and also the microstructural nature of the material adjacent to the channel, which is akin to that found when examining friction stir processed regions. Several problems arise when using this technique. Namely, the displaced material is typically deposited just under the tool shoulder (which typically has a degree of clearance from the workpiece) or at the surface of the workpiece distal to the tool, either leading to a processed surface which is proud relative to the unprocessed surfaces and/or generation of a great deal of flash. The surface finish will at best be quite rough with the typical repeating crescent pattern seen when carrying out friction stir with a rotating shoulder. Also, the cross section of the channel formed is likely to fluctuate vastly during changes in processing conditions, such as when rounding a corner (to make a serpentine or curved channel) or as temperature/forces change the viscoplastic properties of the material being processed, due to a progressive build-up of heat in the workpiece, for instance. A particular concern when attempting to use this process for commercial products is the rough surface of the channel inner faces and the roughness of the surface, especially on the tool retreating side.

PT105628B describes a procedure for opening or creating friction stir channels with reduced need for post-process finishing by removing the excess material during the process, keeping the proximal surface approximately planar. The displacement of material is driven by the geometrical features of a rotating tool, comprising a co-rotating scrolled shoulder and a threaded probe. Two tool designs are described; one tool allows the material extracted from the component to be deposited on the surface as flash, which remains joined to the edges of the track of the tool path, and a second design features cutting inserts mated to the rotating shoulder that allow the material extracted to be cut as swarf. Although the tools and processes described reduce the amount of material debris present on the workpiece surfaces, the surface over which the tool passes will be rough, still having the crescent marks described above. Additionally, often the edges of the track processed by the rotating shoulder will have a significant flash lip, as the viscoplastic material is driven towards the surface.

None of the above solutions presented in the art provide a method for forming uniform, consistent channels, nor do they appear to address the issues of surface finish or satisfactory control of displaced material.

SUMMARY OF THE INVENTION

In accordance with a first aspect of the present invention, a friction stir channelling tool comprises a probe for inserting into a workpiece or workpieces, the probe extending from, and being rotatably mounted in, a bore of a shoulder, the probe surface being formed so as to cause plasticised workpiece material to be moved towards the shoulder and into the bore of the shoulder upon rotation of the probe while the shoulder is in contact with the workpiece, and wherein the shoulder has at least one vent extending from outside the shoulder to the bore whereby the plasticised material can exit the bore through the vent.

In accordance with a second aspect of the present invention, a method of friction stir channelling comprises rotating a probe of a friction stir channelling tool according to the first aspect of the invention, causing the rotating probe to enter a workpiece and bringing the shoulder of the tool into contact with the workpiece, the shoulder, or at least the radially outer portion of the shoulder in the case where the shoulder has radially inner and outer portions, not rotating relative to the workpiece, whereby rotation of the probe causes material of the workpiece around the probe to be plasticised and conveyed up along the probe to enter the bore of the shoulder and exit through the vent or one of the vents in the shoulder; and traversing the tool along the workpiece under working conditions such that a channel is formed inside the workpiece.

The shoulder can be brought into contact with the workpiece before or after the rotating probe enters the workpiece. wherein the latter case the probe is extended from the bore of the shoulder whilst the shoulder is already in contact with the workpiece.

The probe is provided in a form that promotes a high degree of material removal from the bulk of the workpiece (s). This is typically in the form of threads and/or flutes that promote movement of material in a direction away from the workpiece bulk. This differs from typical friction stir welding (or processing) probes, which are designed to promote material mixing in accordance with the teachings of WO95/26254 and EP-B-0615480.

The process of extracting the material from the workpiece (s) leads to the formation of a closed channel within the workpiece(s). In the case of more than one workpiece, the process can be used to join workpieces together as the channel is being formed. This is accomplished by special design of the probe, usually with features designed to move material in different directions and with different magnitudes. If the workpiece material is a metal, the material surrounding the channel (or composing the processed/joined region) is typically formed of a deformed metal having a refined metallurgical grain size, with known relevant material property benefits provided by such. Workpieces processed according to the invention typically display a characteristic 'narrow', flat-sided microstructural footprint when compared to the use of more traditional friction stir tools, which usually have a 'V' shape, caused by action of a rotating body (e.g. shoulder) at one end of the probe or use of a conical form of probe.

The bore can have a smooth form or threaded/textured form with features for aiding material transport along or away from the probe.

A single vent can be provided but preferably there are multiple vents. The provision of multiple vents improves 'cornering' performance when making serpentine paths, with consistent feed pressure of material removed leading to a consistent channel profile. The vents are preferably provided in a symmetrical fashion around the bore, but can vary in number and placement dependent on application. Typically, the or each vent extends radially outwardly from the bore but the or each vent could have a direction with an axial component. Vented material can be wound onto a reel, stored in another manner (e.g. for recycling), or cut/blown from the body in a manner typical of swarf removal.

The portion of the shoulder in contact with the workpiece(s) is typically of a wear-resistant character and can be provided with a surface coating or treatment exhibiting one or more of low friction, wear resistance, temperature resistance, diffusion resistance, low reactivity and solid state lubrication. The contacting portion of the shoulder can take the form of a flat plate for simple flat workpieces, or could conform to the shape of the workpieces (inner or outer shape of cylinders, corners, stepped/dissimilar thickness workpieces). The contacting portion can be simply provided in the form of a ring around the probe.

Temperature control of the shoulder in regions near any bearings disposed between the shoulder and rotating means is usually necessary to prevent damage to the bearings, wider structure supporting/carrying the shoulder and probe and rotating means. Also, it is often useful to separately monitor and maintain temperature control of the part of the shoulder closest to workpiece(s) and/or the probe, and/or the workpiece itself, since changes in temperature will lead to changes in physical (e.g. viscoplastic) properties and concomitantly changes in the properties of the processed workpiece. Changes in material properties or processing temperature may lead to changes in cross-section, internal surface finish and material properties. Methods and apparatus according to the invention are particularly useful, as the thermal input, position and downforce provided by different components of the tool can be closely and independently controlled, leading to better control over the channels formed and also of the characteristics of the extracted material, if this is to be extracted for a particular use. Using the techniques of the prior-art, where the friction stir channelling tool consists of a co-rotating pin and shoulder, far less control is possible.

Although the probe can penetrate the workpiece(s) whilst fully protruding from the shoulder, it is preferable to use a retractable probe, where the penetration depth of the probe can be varied at different parts of the processing cycle. When forming channels, changes in probe depth can be used to change channel depth or channel size.

Retractable probe technology can also be used to extract the probe while keeping the shoulder in contact with the workpiece(s). Extracting the rotating probe through the shoulder bore, while keeping the shoulder in contact, will prevent potential blockages of the shoulder and probe assembly due to workpiece debris. This technology can also be used during the insertion of the probe, where the shoulder is in contact with the workpieces prior to probe insertion, as previously described.

Gas shielding may be provided for particular workpiece materials particularly oxygen sensitive materials such as Titanium. For example, this may be provided by atmospheric control over the whole workpiece (e.g. processing in a chamber), as a localised blanket, in the form of jets from the shoulder or as a shroud enclosing the probe and at least the workpiece contacting part of the shoulder.

Although the probe can be in the form of a simple 'pin', cylinder or other design, the probe can take the form of a pin and radially inner shoulder portion, where the shoulder portion also rotates either with or independently from the pin, with the remainder or radially outer portion of the shoulder being disposed at least partially around the circumference of the inner shoulder portion and at least partially in contact with the workpiece(s). In this case, the inner shoulder portion may have a scroll or other form on its face to move material towards the port in the shoulder, located adjacent to the probe or at the periphery of the inner shoulder portion. The face of the inner shoulder portion could be co-planar with the remainder of the shoulder, or have any number of angular configurations, including concave, convex or variable taper sections. It is useful in the case of a co-rotating probe pin and inner shoulder portion for the features on the probe pin and shoulder portion to cooperate, e.g. flutes may run along the length of the pin and continue onto the shoulder portion, sometimes extending all the way to the part of the shoulder most proximate to the bore.

Pilot holes can also be drilled at the location where the probe penetrates the workpiece to reduce forces applied to the probe during the early stages of the process.

During practice of the method, it is possible to adjust the processing parameters (probe rotation speed, drive motor torque, feed rate, downforce) to adjust the characteristics of the processed workpieces. Often, when rounding corners, depending on the application, it may be necessary to change these parameters to maintain characteristics such as the shape, form and surface finish of a formed channel or processed region.

The probe penetration depth within the workpiece and shoulder position can be controlled using position and/or force control strategies. Position control will be most applicable when processing flat workpieces or parts with adequate dimensional/geometrical accuracy. Force control will be a more useful strategy to counteract machine and part deflection when processing curved surfaces or complex trajectories. There is the option of controlling the probe and the shoulder independently. The contact between the shoulder and the workpiece surface can be ensured using force control, while the probe penetration within the workpiece and channel depth can be controlled using position control.

The rate at which the material is extracted from the workpieces (and consequently the void cross section) can be controlled by adjusting either the rotation speed of the probe or the torque applied to the probe by the spindle drive motor. As in friction stir welding, heat is produced primarily by viscous dissipation in the workpiece material close to the tool, driven by the high shear stresses at the tool/workpiece interface. Torque control allows manipulation of the viscosity of the material being swept by the tool and can be an effective mean of controlling process temperature and the void cross section. Controlling the probe rotation speed will determine the volumetric rate of material extracted in each revolution, but it will not be able to compensate for the eventual build-up of heat within the workpieces. Both these approaches may be used in conjunction with force or position control for maintaining probe position and shoulder position.

Advantages of using the present invention include:
Smooth surface finish. Processed workpiece surfaces will not present the typical crescent marks produced by a prior-art rotating tool method or flash from a prior-art tool. Furthermore, the channel is generated by extracting the material into the tool, instead of (in the prior art) to the outer surfaces of the shoulder. This avoids formation a bulge of material on the surface of the workpiece(s), which would have to be removed post-processing using machining or finishing operations.

Better ability to process cylindrical bodies or corner configurations.

Effective control of the volume of material extracted, giving the ability to produce channels with a more continuous and stable cross section.

Typical applications for methods and apparatus according to the invention include forming channels in long metal structures in which cables (e.g. power, communication or NDT wires) need embedding (aerospace and other transport structures, power generation structures such as wind turbines). One of the most promising industrial applications is the manufacture of heat exchangers by incorporating serpentine channels inside plates, tubular or block components for internal fluid flow. Other potential uses include the production of channels to embed instrumentation or mechanisms, as well as networks for lubrication, fluid storage or hydraulics. The invention may also be used as a weight reduction technique, by fabricating hollow panels or structures for light weight assemblies.

As well as creating channels, the material removed during practice of the invention can form an extruded wire. The ports can be designed with a particular cross section, which will then be reflected in the cross section of the extruded wire. The composition of the wire will also be influenced by the materials of the workpieces, for instance a mixed-material or dissimilar workpieces will result in extrusion of a composite material wire.

Workpieces processed according to the invention can be single monolithic or multiple workpieces in a butt, lap, corner or other configuration, as would be obvious to a person skilled in the art. Also, rather than just a single body, it is possible for thicker workpieces to use a probe that penetrates completely through the workpiece(s) and is supported by a second body (rotating or non-rotating) or some form of bearing device. The thread form on the probe could be adjusted to form multiple channels in one pass, for example with a variable handed thread moving material toward both bodies.

Typical workpiece materials processed according to the invention include metals based upon aluminium, magnesium, copper, lead and other similar materials. Some polymers such as PVC and acrylic can also be processed. It is also possible to process high temperature metals based upon iron, titanium, nickel and others, using advanced tool materials.

BRIEF DESCRIPTION OF THE DRAWINGS

Examples of the invention are illustrated with reference to the accompanying drawings, in which.

DESCRIPTION OF PREFERRED EMBODIMENTS

Figure 1:
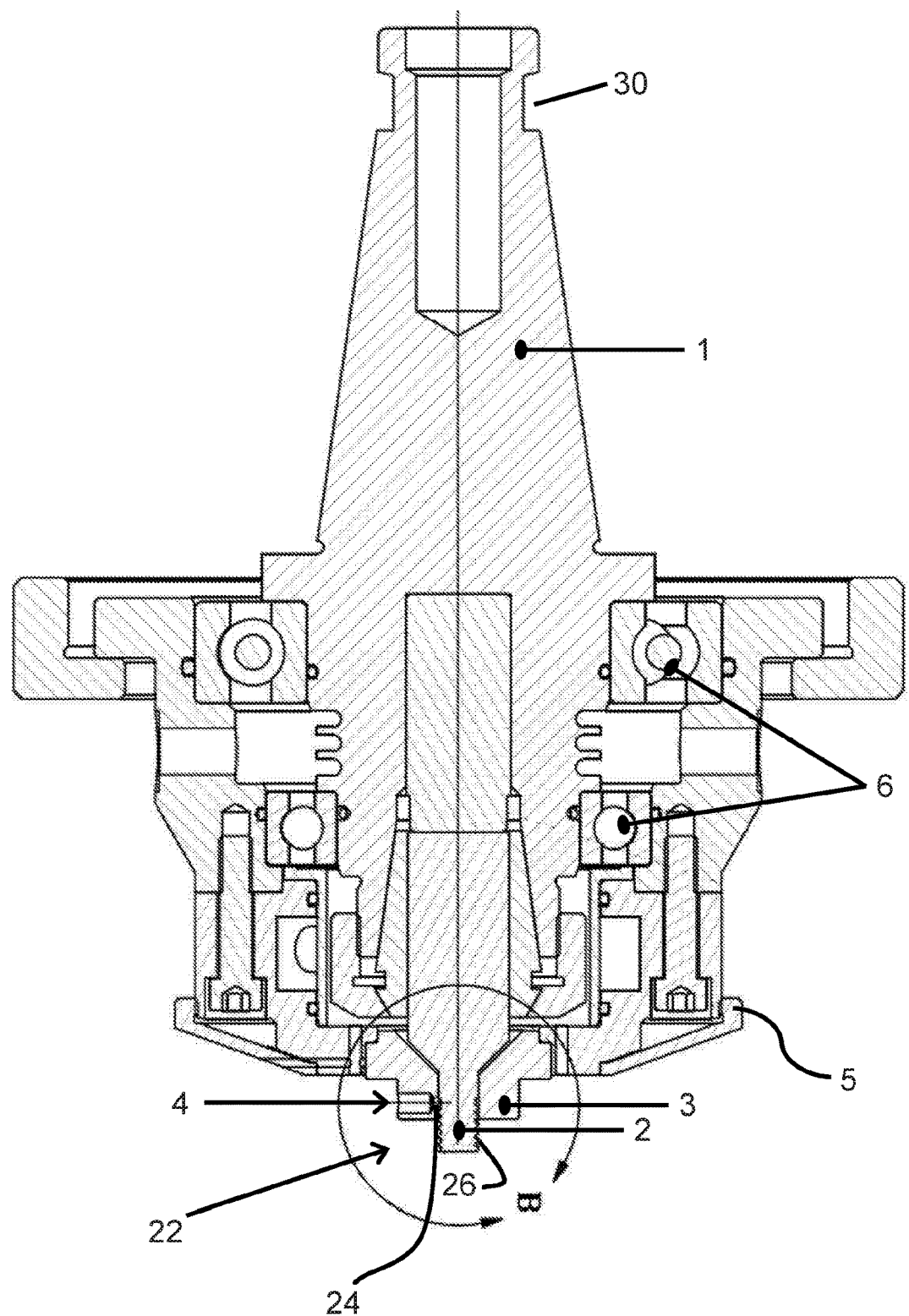
FIG. 1 is a schematic diagram of a first example of an apparatus for carrying out a method according to the invention.

FIG. 1 illustrates a practical example of an apparatus for carrying out methods according to the invention. In this case, the apparatus comprises a main body 5 which rotatably supports via body bearings 6 a machine spindle 1, the upper end 30 of which will be connected to a drive motor (not shown) for rotatably driving the machine spindle. The machine spindle 1 houses and rotatably drives a threaded friction stir channelling tool 22 which comprises a probe 2, located in a bore 14 of a shoulder 3 fixed to the main body 5. In use the probe is applied under load into the workpiece(s) for processing. The shoulder 3 and main body 5 do not rotate due to the action of the bearings 6. The threaded sections on the probe 2 has a threaded surface 26 which extends from its tip into the bore 24 which acts to draw material toward the shoulder 3 and into a narrow gap between the probe 2 and the wall of the bore 24. The shoulder 3 also has a number, in this case four, of radially extending vents 4 which extend between an outer surface of the shoulder 3 and the bore 24. The extracted workpiece material is forced through the vents 4 in a wire form.

Figure 2:
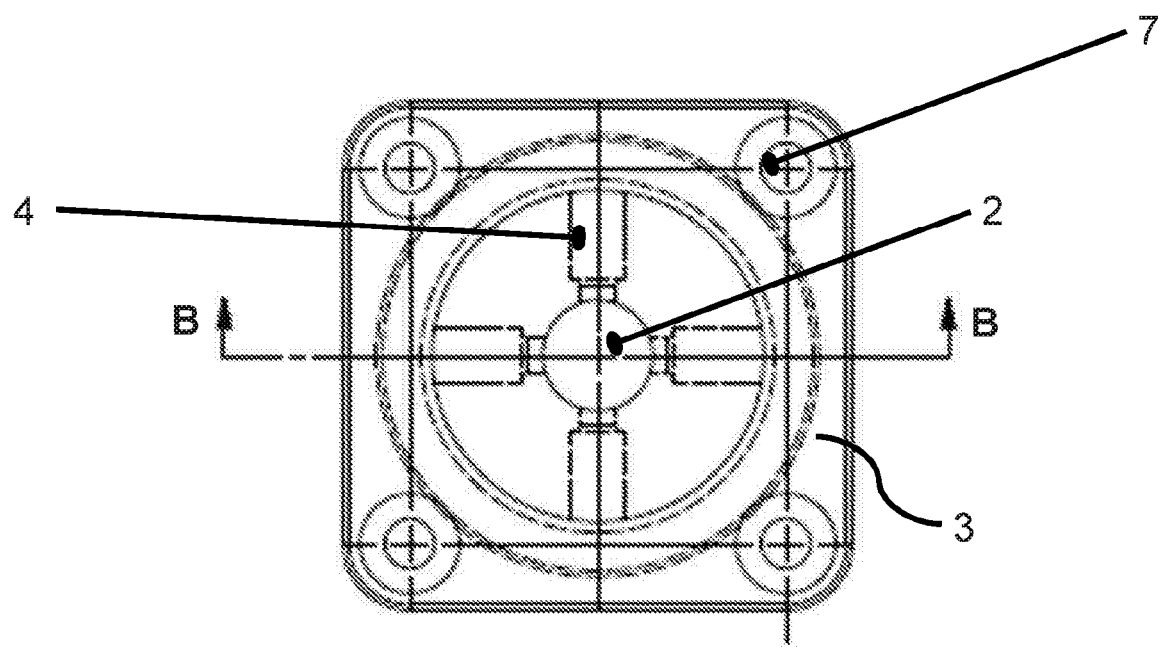
FIG. 2 is a schematic diagram cut-through of the area marked as 'B' in FIG. 1.

FIG. 2 illustrates a cut-away view of the section marked 'B' on FIG. 1, showing the non-rotating shoulder 3 with rotating probe 2 and vents 4, arranged in a symmetrical manner around the tool. The shoulder 3 is mated to a lower part of the main body 5 by bolts 7.

Figure 3:
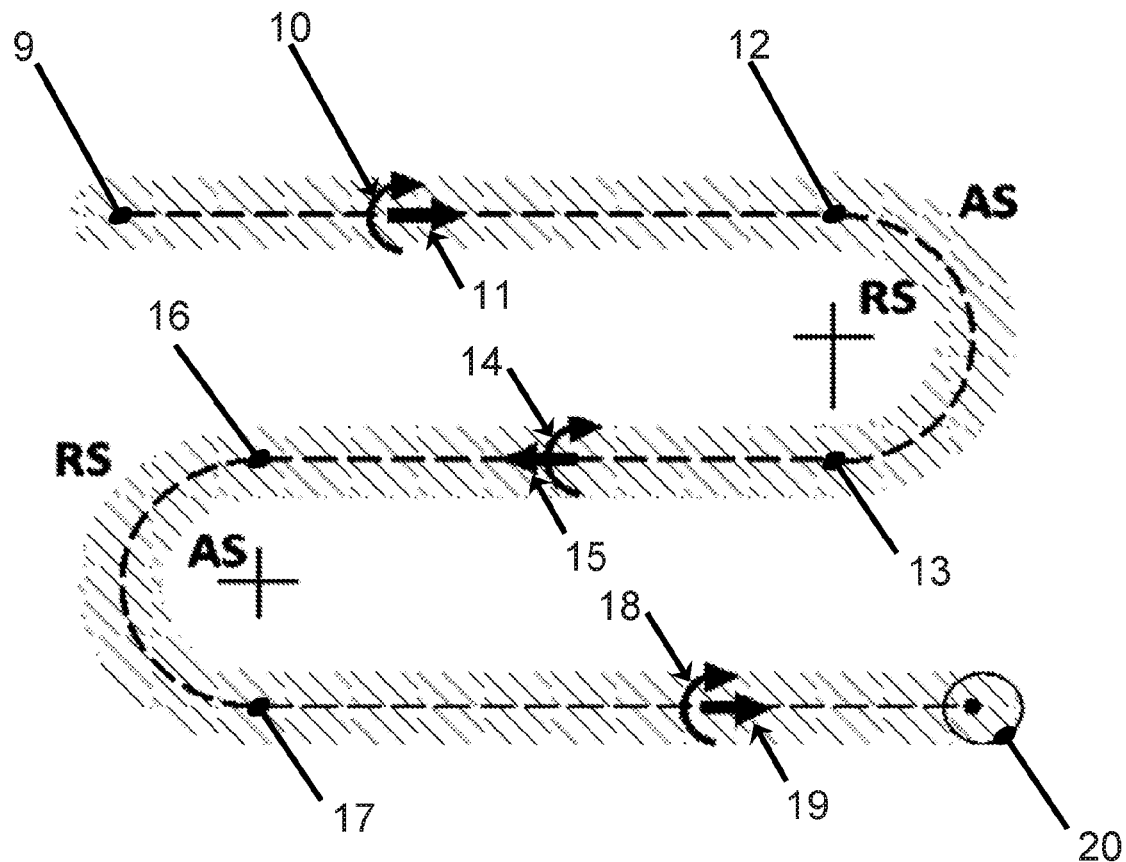
FIG. 3 shows an example serpentine path carried out in accordance with the invention.

FIG. 3 shows an example processing path and with reference to this figure, an example method according to the invention will be described. The apparatus shown in FIGS. 1 and 2 was used to form a serpentine channel in an aluminium alloy plate of AA6082-T4, with water cooling of the bearings but, in this case, not of the region around the probe 2 or shoulder 3. A pilot hole was drilled in the plate at entry point 9 using a 6.9 mm diameter drill bit to a depth of 7 mm. The non-rotating shoulder 3 was pressed against the plate with a force of 18 kN, with the probe 2 in-line with the pilot hole. The probe 2 was rotated at a speed of 600 rev/min and gradually plunged into the pilot hole. Once fully plunged, the probe was allowed to dwell for 5 seconds at entry point 9 before the shoulder 3 and probe (via the main body) were ramped up to a travel speed of 50 mm/min over the course of 5 seconds in travel direction 11 with the probe rotating in clockwise direction 10 toward the curve start point 12. Once at the first curve start point 12, the apparatus was made to follow a curved trajectory to first curve end point 13. The letters 'AS' are shown to indicate the Advancing Side of the probe 2, where the direction of rotation of the probe is the same as the travel direction. The letters 'RS' are shown to indicate the Retreating Side of the probe 2, where the direction of rotation of the probe is opposite to the travel direction. During the first curve, AS was on the outside of the curve whilst RS was on the inside. The apparatus then traversed at a steady travel speed from the first curve end point 13 in a straight line toward second curve start point 16, whilst the friction stir probe rotated clockwise 14 in travel direction 15. Once at second curve start point 16, the apparatus was made to follow a curved trajectory to second curve end point 17, with RS this time on the outside and AS on the inside. The apparatus then traversed from second curve end point 17 to exit point 20 rotating clockwise 18 in direction 19. Before reaching the exit point, the apparatus was ramped down in speed to zero traverse over the course of 5 seconds. Once at the exit point 20, the probe was gradually retracted from the plate leaving an exit hole. Parameters such as probe rotation speed and traverse speed were kept constant when moving from the linear segments to the curved portions of the path.

Using the method and apparatus of the present invention when compared to prior-art methods, the consistency of the channels produced is superior with more consistent section and inner roughness not just during the linear traverses, but also around both curve types with changes of AS and RS on the curve outer and inner. The surface finish is also far superior, with no noticeable flash or bulging of the processed area.

Figure 4:
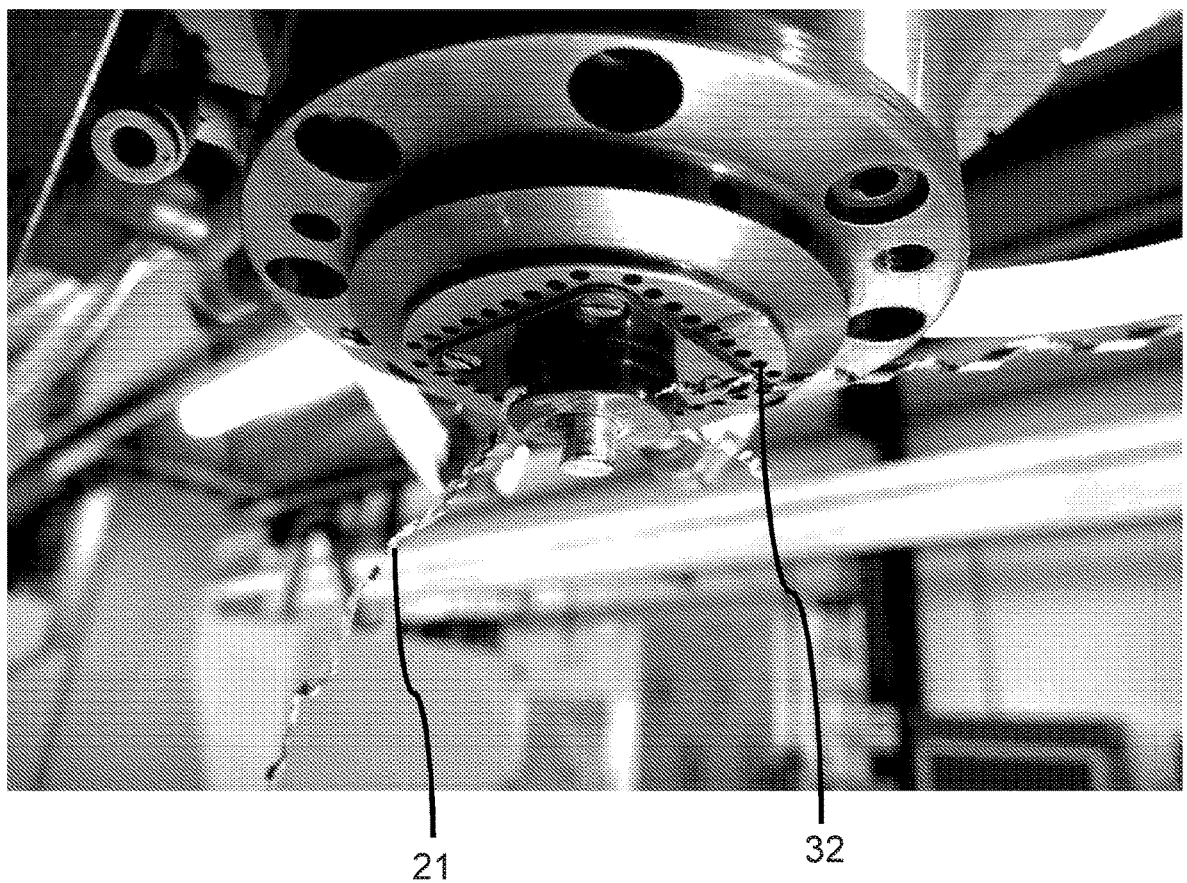
FIG. 4 is a photograph of a first example of an apparatus for carrying out a method according to the invention.

FIG. 4 shows a photograph of the apparatus immediately after carrying out the steps described in relation to FIG. 3, with a ribbon of workpiece material 21 protruding from vents 4. This figure also shows gas vents 32 through which a gas curtain can be supplied.

Figure 5:
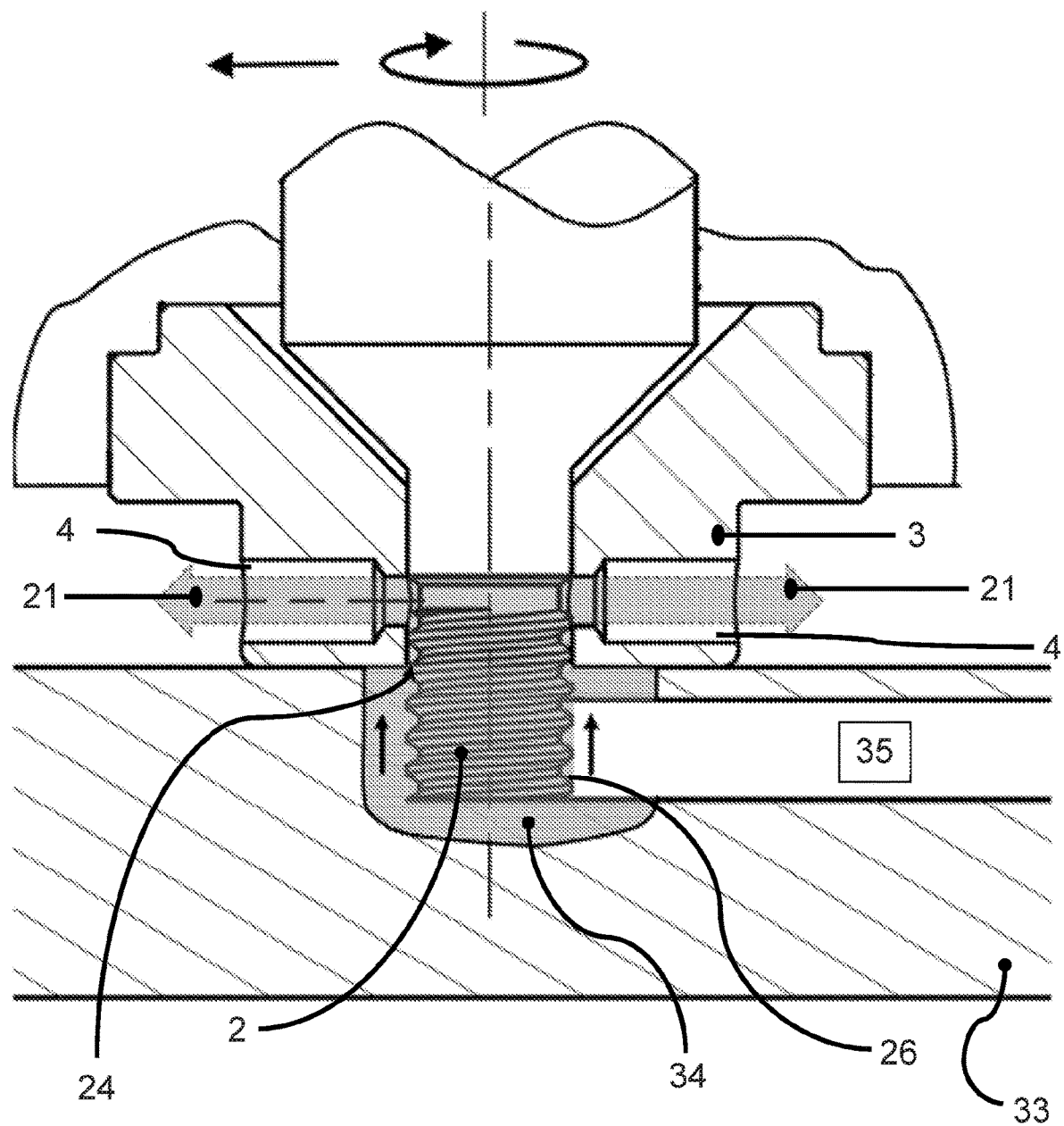
FIG. 5 is a schematic section showing the structure of the tool in more detail and illustrating how the material is conveyed by the probe geometric features into the shoulder bore and forced to exit through the vents.

FIG. 5 is a schematic section showing the structure of the tool in more detail (taken from the cut-away 'B' in FIG. 1) during production of a channel and illustrating how the material is conveyed by the geometric features of the rotating probe into the shoulder bore and subsequently forced to exit through the vents. Rotating probe 2 is traversed through workpiece 33. The action under rotation of threaded surface 26 causes formation of plasticised workpiece material 34, which is moved towards the shoulder 3 and into the bore 24 of the shoulder before exiting vents 4 as ribbons (or other extruded shapes) of workpiece material 21, whereby a channel 35 is formed in the workpiece.

The invention claimed is:

1. A method of friction stir channelling comprising:
   rotating a probe of a friction stir channelling tool having:
      a probe for inserting into a workpiece or workpieces, the probe extending from, and being rotatably mounted in, a bore of a shoulder, the probe surface being formed so as to cause plasticised workpiece material to be moved towards the shoulder and into the bore of the shoulder upon rotation of the probe while the shoulder is in contact with the workpiece, and
      wherein the shoulder has at least one vent extending from outside the shoulder to the bore whereby the plasticised workpiece material can exit the bore through the vent;
   causing the rotating probe to enter a workpiece and bringing the shoulder of the tool into contact with the workpiece, the shoulder, or at least a radially outer portion of the shoulder in the case where the shoulder has radially inner and outer portions, not rotating relative to the workpiece,
   whereby rotation of the probe causes material of the workpiece around the probe to be plasticised and be drawn up the probe to enter the bore of the shoulder and exit through the vent or one of the vents in the shoulder; and
   traversing the tool along the workpiece under working conditions such that a channel is formed inside the workpiece.

2. The method according to claim 1, wherein the probe surface is formed with one or more threads or flutes to cause the plasticised workpiece material to be moved towards the shoulder.

3. The method according to claim 1, further comprising a plurality of vents, each extending through the shoulder and communicating with the bore.

4. The method according to claim 1, wherein a plurality of vents are symmetrically arranged around the bore.

5. The method according to claim 1, wherein the vent or each vent extends radially outwardly from the bore of the shoulder.

6. The method according to claim 1, wherein a surface of the shoulder is adapted to contact the workpiece or workpieces and is wear resistant.

7. The method according to claim 1, wherein the shoulder is provided with a surface coating or treatment exhibiting one or more of low friction, wear resistance, temperature resistance, diffusion resistance, low reactivity and solid state lubrication.

8. The method according to claim 1, wherein a surface of the shoulder is a flat surface extending orthogonally to the axis of rotation of the probe.

9. The method according to claim 1, wherein a surface of the shoulder is curved to match a curved workpiece.

10. The method according to claim 1, wherein the probe is retractable at least partially into the bore of the shoulder.

11. The method according to claim 1, wherein the shoulder is adapted to remain stationary while the probe is rotated.

12. The method according to claim 1, wherein the shoulder includes a radially inner portion that is adapted to rotate with the probe and is preferably integrally formed with the probe.

13. The method according to claim 1, wherein a surface of the shoulder, and particularly a radially inner portion if provided, has a formation to move the plasticised workpiece material towards the bore of the shoulder.

14. The method according to claim 1, wherein the tool is traversed along a curved, typically serpentine, path.

15. The method according to claim 1, wherein the material exiting the vent or each vent is wound onto a reel.

16. The method according to claim 1, wherein the workpiece has a curved surface and the shoulder has a correspondingly curved surface to engage the workpiece.

17. The method according to claim 1, wherein at a start of the process the probe is axially moved, while rotating outwardly from the bore, to contact the workpiece, and thereafter the shoulder is brought into contact with the workpiece, while at an end of the process the probe is retracted into the bore.

18. The method according to claim 1, wherein at a start of the process the shoulder is brought into contact with the workpiece, and thereafter the probe is axially moved, while rotating outwardly from the bore, to contact the workpiece.

19. The method according to claim 1, wherein the workpiece is a single monolithic workpiece or multiple workpieces in a butt, lap or corner or other configuration.

20. The method according to claim 1, wherein the workpiece material is selected from at least one material selected from the group of materials including: metals and polymers.

* * * * *